US009423922B2

(12) United States Patent
Welinder et al.

(10) Patent No.: US 9,423,922 B2
(45) Date of Patent: Aug. 23, 2016

(54) SYSTEMS AND METHODS FOR CREATING SHARED VIRTUAL SPACES

(71) Applicant: Dropbox, Inc., San Francisco, CA (US)

(72) Inventors: Nils Peter Welinder, San Francisco, CA (US); Thomas Kleinpeter, San Francisco, CA (US); Thomas Wright, San Francisco, CA (US); Ramesh Balakrishnan, San Francisco, CA (US); Tina Wen, San Francisco, CA (US); Rajeev Nayak, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 21 days.

(21) Appl. No.: 14/247,853

(22) Filed: Apr. 8, 2014

(65) Prior Publication Data

US 2015/0180914 A1    Jun. 25, 2015

Related U.S. Application Data

(60) Provisional application No. 61/920,730, filed on Dec. 24, 2013, provisional application No. 61/945,814, filed on Feb. 27, 2014.

(51) Int. Cl.
G06F 3/0481    (2013.01)
H04L 29/06    (2006.01)
(Continued)

(52) U.S. Cl.
CPC .............. G06F 3/0481 (2013.01); G06F 9/542 (2013.01); G06F 11/2082 (2013.01);
(Continued)

(58) Field of Classification Search
CPC ....................................................... G06F 3/048
See application file for complete search history.

(56) References Cited

U.S. PATENT DOCUMENTS 5,999,208 A * 12/1999 McNerney ............... H04N 7/15
                                                              348/14.03
6,343,313 B1    1/2002 Salesky et al.
(Continued)

FOREIGN PATENT DOCUMENTS

EP    1422901 A1    5/2004

OTHER PUBLICATIONS

Yousef, Kharsim; O'Neill, Eamonn, "Sunrise: Towards location based clustering for assisted photo management"; ICMI'07: Workshop on Tagging, Mining and Retrieval of Human-Related Activity Information, TMR'07—Workshop Proceedings, p. 47-54, 2007, ICMI'07: Workshop on Tagging, Mining and Retrieval of Human-Related Activity Information, TMR'07—Workshop Proceedings; ISBN-13: 9781595938701.

(Continued)

*Primary Examiner* — Phenuel Salomon
(74) *Attorney, Agent, or Firm* — Keller Jolley Preece

(57) ABSTRACT

Systems and methods are provided for creating shared virtual spaces ("rooms"). A room may be created when a user first shares images with another user. A user may send a request to a content management system to share one or more images with various contacts. In response, a room is created by the content management system in which a copy of each image is stored. Images added to a room are copied to a separate "rooms" database, and "locked," being saved in the room for a period of time, which may be indefinitely. Changes made by the user to a room via a user device may be displayed as soon as indicated, without waiting for the information to be sent to a system server or its state to be made consistent with that of the user device. Room activity notifications may be sent to members in various ways.

25 Claims, 15 Drawing Sheets

(51) Int. Cl.
*H04L 12/58* (2006.01)
*H04L 29/08* (2006.01)
*G06F 9/54* (2006.01)
*G06F 11/20* (2006.01)

(52) U.S. Cl.
CPC ............. *H04L 51/04* (2013.01); *H04L 51/046* (2013.01); *H04L 65/403* (2013.01); *H04L 67/06* (2013.01); *H04L 67/141* (2013.01)

(56) References Cited

U.S. PATENT DOCUMENTS

| | | | |
|---|---|---|---|
| 6,691,154 B1 | | 2/2004 | Zhu et al. |
| 7,043,525 B2 | | 5/2006 | Tuttle et al. |
| 7,478,129 B1 | * | 1/2009 | Chemtob ............ H04L 12/1827 709/204 |
| 7,685,134 B2 | | 3/2010 | Myka et al. |
| 7,702,730 B2 | | 4/2010 | Spataro et al. |
| 7,774,412 B1 | | 8/2010 | Schnepel |
| 7,930,362 B2 | | 4/2011 | Rumelhart |
| 7,933,956 B2 | * | 4/2011 | Hon et al. ...................... 709/205 |
| 8,185,601 B2 | | 5/2012 | Rauhala et al. |
| 8,225,311 B1 | | 7/2012 | Robertson et al. |
| 8,244,848 B1 | * | 8/2012 | Narayanan et al. ............ 709/223 |
| 8,294,557 B1 | * | 10/2012 | El Saddik et al. ........... 340/407.1 |
| 8,296,644 B2 | | 10/2012 | Koren |
| 8,370,423 B2 | | 2/2013 | Ozzie et al. |
| 8,510,404 B2 | | 8/2013 | Carmel et al. |
| 8,527,549 B2 | | 9/2013 | Cidon |
| 8,533,231 B2 | | 9/2013 | Aizman et al. |
| 8,693,648 B1 | * | 4/2014 | Drugge et al. ............. 379/93.21 |
| 2003/0182327 A1 | | 9/2003 | Ramanujam et al. |
| 2004/0237033 A1 | * | 11/2004 | Woolf ................... G06F 17/242 715/211 |
| 2006/0143435 A1 | | 6/2006 | Kwon |
| 2007/0016632 A1 | | 1/2007 | Schulz et al. |
| 2008/0140650 A1 | * | 6/2008 | Stackpole ........................ 707/5 |
| 2008/0229215 A1 | * | 9/2008 | Baron et al. .................. 715/751 |
| 2009/0030952 A1 | | 1/2009 | Donahue et al. |
| 2009/0094602 A1 | * | 4/2009 | Ziskind et al. ................ 717/178 |
| 2009/0157693 A1 | * | 6/2009 | Palahnuk ........................ 707/10 |
| 2010/0037161 A1 | | 2/2010 | Stading et al. |
| 2010/0153857 A1 | | 6/2010 | Sanchez et al. |
| 2010/0162126 A1 | | 6/2010 | Donaldson et al. |
| 2010/0205148 A1 | | 8/2010 | Leblanc et al. |
| 2010/0325153 A1 | | 12/2010 | Thakkar et al. |
| 2011/0153696 A1 | | 6/2011 | Saxena et al. |
| 2011/0219307 A1 | * | 9/2011 | Mate et al. ..................... 715/717 |
| 2011/0260860 A1 | * | 10/2011 | Gupta ...................... 340/539.13 |
| 2012/0054640 A1 | | 3/2012 | Nancke-Krogh |
| 2012/0109590 A1 | | 5/2012 | Trainer et al. |
| 2012/0117271 A1 | | 5/2012 | Kennedy et al. |
| 2012/0131477 A1 | * | 5/2012 | Marsden ........................ 715/753 |
| 2012/0287034 A1 | | 11/2012 | Park et al. |
| 2012/0297041 A1 | | 11/2012 | Momchilov |
| 2012/0324589 A1 | | 12/2012 | Nukala et al. |
| 2013/0013560 A1 | | 1/2013 | Goldberg et al. |
| 2013/0021368 A1 | | 1/2013 | Lee et al. |
| 2013/0066963 A1 | | 3/2013 | Odio et al. |
| 2013/0066964 A1 | | 3/2013 | Odio et al. |
| 2013/0132477 A1 | * | 5/2013 | Bosworth et al. ............. 709/204 |
| 2013/0132856 A1 | | 5/2013 | Binyamin et al. |
| 2013/0147845 A1 | | 6/2013 | Xie et al. |
| 2013/0151581 A1 | | 6/2013 | Leggette et al. |
| 2013/0211870 A1 | | 8/2013 | Lawson et al. |
| 2015/0052458 A1 | * | 2/2015 | Rothenberger et al. ....... 715/757 |

OTHER PUBLICATIONS

Henze, Niels; Boll, Susanne, "Snap and share your photobooks"; MM'08—Proceedings of the 2008 ACM International Conference on Multimedia, with co-located Symposium and Workshops, p. 409-418, 2008, MM'08—Proceedings of the 2008 ACM International Conference on Multimedia, with co-located Symposium and Workshops; ISBN-13: 9781605583037; DOI: 10.1145/1459359.1459414.

Cathy Marshall ; John C. Tang, "That syncing feeling: early user experiences with the cloud"; Published in: DIS '12 Proceedings of the Designing Interactive Systems Conference pp. 544-553 ACM New York, NY, USA 2012.

Buford, J.; Mahajan, K.; Krishnaswamy, V., "Federated enterprise and cloud-based collaboration services"; Source: 2011 IEEE 5th International Conference on Internet Multimedia Systems Architecture and Application (IMSAA), 6 pp., 2011.

\* cited by examiner

SYSTEMS AND METHODS FOR CREATING SHARED VIRTUAL SPACES

CROSS-REFERENCE TO RELATED APPLICATIONS

The present application claims the benefit of U.S. Provisional Patent Application No. 61/920,730, filed on Dec. 24, 2013, entitled "SYSTEMS AND METHODS FOR PROVIDING SHARED VIRTUAL SPACES ("STREAMS"), and U.S. Provisional Patent Application No. 61/945,814, filed on Feb. 27, 2014, entitled "SYSTEMS AND METHODS FOR CREATING SHARED VIRTUAL SPACES," both of which are hereby incorporated herein by reference in their entirety.

FIELD OF THE INVENTION

Various embodiments generally relate to systems and methods for creating shared virtual spaces.

BACKGROUND

While photograph applications, video applications, and other content sharing applications have become increasingly popular, the services and features currently provided by these sorts of applications come with inherent limitations. Recognizing these limitations, online content management systems purport to offer a user a convenient portal for cloud storage and interactivity with his or her content. However, in such systems, as well as in the applications running on user devices which they support, content tends to be organized within a user's "account." Within an account there may be various folders, collections, and other groupings, but such groupings may be performed by content type, and not necessarily based upon the people with whom certain content items are regularly shared. It is noted, though, that in their own minds, people do not organize data in folders or file hierarchies. Certain content items, such as, for example, photographs and videos, are understood to be related not just by their inherent content, but also by the set of people with whom they are naturally shared. In some embodiments, content items may be organized based on the content included within the content items. For example, a user may organize certain subsets of their image content, for example, as "family vacation shots," "Bob's wedding photos," "videos from grandma and grandpa's fortieth wedding anniversary" or, for example, "photos of the new restaurant site our architecture team is developing." Should a user wish to share such content items, or even a collection of them, he or she may do so with whomever the user wishes. However, in order for one or more recipients of these content items or collections to share additional content items, or provide feedback to the shared content items or collections, the recipient must individually select each new recipient. This problem becomes especially cumbersome and problematic when the number of people involved in a shared collection reaches large numbers (e.g., 1,000 users). This problem may be further exacerbated by the fact that multiple users may attempt to share many similar content items, or due to network latencies experienced by different users located in different areas.

Thus, it would be beneficial for developing means that enable collective sharing of content between groups of users regardless of network conditions and the size of the group. The collective sharing may allow groups of users to communicate shared content with each user of the group as well as providing a forum that the shared content may be easily accessed and interacted with by any of the parties included therein.

SUMMARY

Systems, methods, and non-transitory computer readable media are provided for multi-party virtual sharing spaces, known sometimes herein as "rooms" and/or singular "room." The parties to a room may include the room's creator, and all other persons with whom he or she shared the content with initially. These parties may sometimes be referred to as "members" of the room. In some embodiments, a room may be automatically created anytime a user of a content management system shares content items or messages about content items with another user. In one example, a share request may be received to share one or more content items with one or more of a user's contacts. In response to receiving the share request, a shared virtual space may be automatically created and may include a copy of the one or more content items selected to be shared. The shared virtual space may be associated with an assigned memory location on a system server, for example. The shared virtual space may be accessed by both the user and the other members, and they may each add further content (e.g., content items and messages) to the shared virtual space. Whenever any content is added to a shared virtual space, all member parties may be notified. In some embodiments other non-members may also be notified, even persons not registered as users with the content management system that provides the rooms service or application. Notifications may be by in-band (i.e., within a content management system or application provided by such a system), out-of-band (e.g., email, SMS, social media notification or post), or any combination of these communications pathways.

For ease of illustration it is noted that the following terminology will be used herein. A room is said to have "members." Depending upon the embodiment, members may be exclusively limited to registered users of the content management system that provides the functionality of the rooms. In other exemplary embodiments, non-registered users of the content management system may also be allowed to be members of the rooms, with either limited or unlimited access rights. A user of a given content management system may therefore be a "member" or a "non-member" of any given room. As noted, someone who is not even a user may be a member, in whole or in part, of a room, depending upon the embodiment.

In some embodiments, members of a room may copy any content in the room to their own individual account on the content management system, and may also freely send copies of content from a room to other persons via email, SMS or post to social media. Each of the parties invited to a room may conveniently access the room at any time, the room being a permanent data structure designed to hold, as well as facilitate, mutual interaction with all of the content in the room. In some embodiments, a content item added to a room may be copied to a separate "rooms" database, and "locked." That is, it cannot be modified further, even if its original owner subsequently modifies the original content item within his or her own account. In such case, those modifications will not be applied to the content items previously copied to the room. The content may be saved in the room for a defined period of time, which may, for example, be indefinitely or any shorter period of time. On a user's mobile device, local changes (e.g., additions of content, posts, adding new people, etc.) made by the user to the shared virtual space may be displayed locally as soon as the changes have been made, such that there being no need to wait for the information to be sent to the server. Thus, a number of rooms may be created locally, various content items may be added to them, and various persons may be added as members to those rooms, prior to any of this information reaching the content management system's server. To the user it simply appears as if the rooms are configured and "shared" as soon as the interaction occurs.

Any content item a user adds to the shared space may be displayed locally on the mobile device, and all interactivity therewith may be facilitated, as if (i) the shared virtual space had already been created on the content management system, and (ii) the at least one content item had already been copied to it. A similar functionality may be applied for adding content to an already existing shared virtual space, whether created by a given user, or by a contact who was invited to join the shared virtual space by the user.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Figure 1:
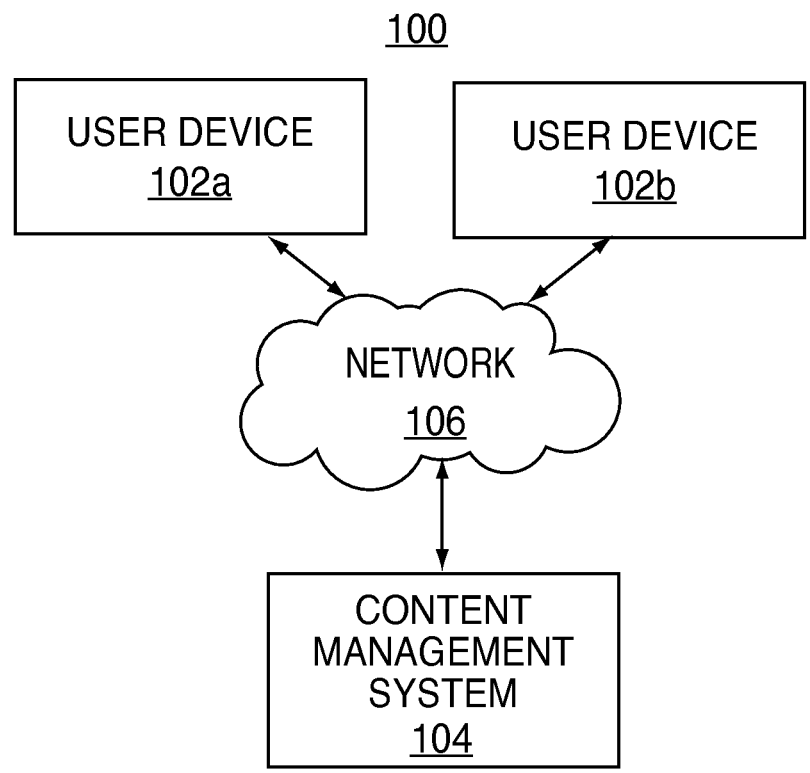
FIG. 1 shows an exemplary system in accordance with various embodiments.

Methods, systems, and computer readable media for supporting the creation of, and a full set of interactivity features with, virtual shared spaces are provided. This functionality may be integrated into an existing content management system or service, or it may be provided as a separate application, or as one of many features in a separate application providing enhanced content management services. An exemplary application providing virtual shared spaces may run on a user device, such as, for example, a smartphone, and may access a user's account with a content management system and thus the content management system's remote server or servers. While in such case the application is ultimately supported from such a server or servers, extended functionality may, for example, be built in to a local client running on the user device. In that manner, the virtual shared space functionality appears to the user as if it is running locally on the user's device—regardless of whether the user's device is weakly, intermittently, or even not at all, connected to the server. By enabling a user to feel as though their device is fully interactive even when connectivity is limited, the user experience and richness of functionality provided to the user may be greatly increased.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 15.

Basic Rooms Functionality: A Virtual Space for Sharing and Conversation

For ease of illustration, the virtual shared spaces described herein shall sometimes be referred to as "rooms." FIGS. 1-14 use this term to designate such a shared space. In exemplary embodiments of the present invention, the core idea of "rooms" is that whenever a user shares a set of photos (or other content items) to anyone, they automatically create a virtual shared space, known as a "room," for themselves and those people. The room is a running conversation thread that is shared between the user and his/her sharee(s), which is accessible to any of them at any time. All content in a given room is accessible to any member of the room at any time, and they may, for example, download it to their own account on a content management system, either piece by piece, or automatically, as described more fully below. Moreover, a room is permanent. Thus, any content a user shares with a room remains part of the room and members of the room can access all of the room's content. In some embodiments, if a member of a room leaves the room, or is removed from the room by one of the other members or the creator of the room, as the case may be, such a former member will not have continued access to the contents of the room, but any content that he or she contributed prior to leaving will remain in the room. Because of this feature, it is most useful to speak not of sharing with a group of other users, but rather to simply share with the "room." Thus, any member can, for example, access content items in a room and/or download them to his or her own account, incorporate them in an email or text message, or post them to a social media website or system, or any combination of those options. The idea of a room in exemplary embodiments according to the present invention is a place where the user goes to continue that conversation with the other members.

It is noted that a room is focused more on private in-band sharing. Rooms do not have the same privacy issues as appending comments and audiences to photos in a user's account on a content management system, for example. This is because a room is a by invitation-only shared space. Rooms also allow for a response to a shared photo, as most people that send photos want to know that they are seen and also appreciated. In addition, a room allows for certain optimizations over conventional content management system functionality. Instead of repeatedly sharing related content to the same group of people, the user need only add the content to the room. For example, a room may be used to collect all the photos from an event.

In exemplary embodiments of the present invention, a user of a content management system may create a new room by sharing content with at least one other user (this assumes that there is no existing room with the same people in it). A room may thus be defined by the set of people that are provided with access to the room. So, for example, if User A and User B are in a room, and User A subsequently sends something else to User B, that additional content goes in the same room. Similarly, if there are three users in the room together, anytime any of them sends something to the other two, then all that content may always go into that room.

In some embodiments, any member can add more people to a room. Once added, the new member has access to the full history of the room. In others, this may be more restricted. In some embodiments, any member can leave a room that they are in, and once they leave, it is as if they were never part of that room. Therefore, to get back in, they must be added back in by a member of that room, for example, or, by whatever more restrictive rule is in place. In some embodiments, a member cannot leave a room if there are only two members.

In this context it is noted that a scenario may arise where, for example, Persons A, B, and C are part of a room and Person C decides to leave. This then creates a "derived" or "survivor" room between Person A and Person B. If there is already a room between A and B, the newly created room does not merge with the existing room, but rather, it may act as a different room. In such case, the new room is not the default room for shares between A and B, but rather the original room for Persons A and B would be. In some embodiments, even if there is not already a room for Persons A and B when Person C leaves, this new room would still not be the default room for shares for Persons A and B. In various embodiments Person C may be added back by either A or B, unless Person C blocks their own re-entry.

In other exemplary embodiments, identical groups of users may have as many rooms as they want to, as long as the room size, which, as noted, is defined by audience size, is greater than one. Alternatively, even a single user may create a room or rooms, such as, for example, by a defined action, which is treated as a share by the user with himself/herself. Allowing for the creation of multiple rooms with the same member or members thus allows an exemplary system to define events or time bounded rooms. For example, say Persons A, B and C are best friends and have a room among them to share photos. They decide to go to Lake Tahoe for fun and decide to make a 'Tahoe" room for just that event. Or for example, if a user went on a hike with some friends and that user did not really know some of the people there, the user can invite them to a new room—the "hiking room", rather than inviting them to, for example, a current room that had already been created with some of the people on the hike. If upon getting to know the new people the user decides to add them to the first room, there would end up being two rooms with the identical audience, but, as above, one more general, one more specific. Thus, rooms may be defined by its members until such time as someone in the room creates a new one, and then invites the original members into it, in which case they become more differentiated, and defined by both the members and content.

Thus, in some embodiments, a default parameter may be set that adds any content to a room that was shared by a member to the other members of that room. In other embodiments, such a sharing to the other members, but not to the room, would create a new room, each having the identical audience, as above. However, if a user chooses to create a new room, even with the same members, he or she may be permitted to do so. In such an event the user will be prompted to name the new room, and may be prompted to also rename the existing room with the identical audience. By allowing multiple rooms with the identical audience, specialized sets of content and conversation surrounding such content may be created. This can be useful, for example, with a large extended family who wishes to make a separate room for a certain type of recurring event, say Christmas, or, for example, "Graduations," "Kids' Weddings," etc. After a certain quantity of content has been shared to a room, the room can become very large, and thus somewhat unwieldy. It may be too large to conveniently scroll through on a user device, and may also become hard to download to a user device with limited capacity. Thus, segmentation of room content, even where the room audience is identical, may be very useful in some embodiments.

Alternatively, if it subsequently turns out that the conversations in the two separate rooms tend to overlap, merge, and refer to one another, and then the two rooms may be merged, for example. In some exemplary embodiments this can only be done if the members of the two rooms are identical. In other embodiments, two rooms with overlapping, but not identical members can be merged.

In some embodiments, rooms may, for example, have a construct called "posts" which may be one of many things. Posts may include, for example, one photo, one video, a set of photos or videos, or a comment with some photos or videos. A post may also include a "like" to a previous post, someone adding a member to a room, someone leaving the room, or someone renaming the room, for example. Thus, in exemplary embodiments of the present invention, any sort of activity that happens within the room can constitute a post.

In some embodiments, because of the permanent nature of a room, no user may remove any other member from it. Thus, while a user may leave a room, and thereby dissociate himself or herself from access to the room, people may not be forcefully removed. Accordingly, once a user has access to a room they may always stay unless they choose to leave, and thereby remove their own access to it. If that occurs, all the posts that they added to the room prior to leaving it may remain in the room, as will be described in greater detail below. In other exemplary embodiments there may be more of an ownership model, where an initiator, or a creator, or a majority vote of the members, may have the right to cull undesirable members from the room.

In some embodiments, there is no limit on how many people may be part of a room. However, this can create scaling issues, especially where very active rooms generate many notifications. Thus, in other embodiments there may be a hard coded limit of, for example, 30, 40 or 50 members per room. Additionally, with larger member sizes, the odds of one of the invitees being undesirable increases, as a matter of sheer sample size. Thus, in some embodiments, where large or unlimited numbers of members per room are supported, an ownership model may be used, where some members (e.g., the creator) may have the power to manage membership on an ongoing basis over other members.

In the context of rooms with many members, or rooms with small membership but many posts, a user may want to "mute," or not see, a given room for a period of time. In some embodiments a user may thus mute one or more rooms, and during such a mute period, the content will not be loaded onto the user's device. Given a finite capacity on a user's device, it may be useful to let a user manually designate which rooms he or she sees at any given time. Similarly, in some embodiments a user may mute conversations within a single room, i.e., by implementing a setting that does not display a given conversation within the room, such as, for example, his two sisters having a discussion about certain wedding photos.

In exemplary embodiments according to the present invention, read receipts may be provided, in terms of knowing what posts a user has seen and has not seen. This is needed when a user goes to a room, so that she may continue where she left off. In some embodiments this feature may be a user level read item. In some embodiments there may be notifications to senders that their recipients have read the post, or seen the shared content.

In exemplary embodiments of the present invention, once a user shares content with a room, that content may be "locked." In other words, the user cannot remove, or modify that content in the room. Moreover, even if he or she subsequently deletes the content from their own account, that content remains in the room. In order to support that feature, a copy of a content item is created when the content item is shared with a room. The copy is then stored in a separate data structure, for example, than the account of the user where it originated. The user is free to modify or delete "his" copy, but may not modify in any way the copy in the room. Thus, for example, a user may take some photos on his smartphone, and upload them to his account on a content management system. He may then decide to share a subset of those photos with a room. If he subsequently deletes all of the photos from his account with the content management system, the subset of photos that was shared remains in the room, and thus has its own "independent existence" that is free and independent of what the original user does to the originals. The same treatment applies to text messages provided as comments to content items shared with a room.

In exemplary embodiments of the present invention, a notification to a user may be pushed (sent) upon the occurrence of any of the following: (i) someone added the user to a room, (ii) someone added one or more photos to a room, (iii) someone added a new person to a room that the user is a member of, (iv) someone added a new message to a room, (v) someone "liked" a photo, (vi) a room name has changed, (vii) the user's photos are loaded (first time experience), (viii) the user's photos are capable of being shared, (ix) the user has unread messages within a room, and/or (x) the application has not been opened for a period of time. This latter notification may notify the user that he/she has used the application recently, and that there may be unread messages or activity that has occurred while the user has "been away."

Additionally, notifications may be sent to users of a content management system that provides rooms functionality, even if those users are not members of a room. For example, even if a user has not registered for or obtained the rooms service, the user may still be notified of the application and certain activities or events that take place therein. For example, this may occur if the user is a candidate for the room but has not yet been added. As an illustrative example, members of a class of students may create a class related room. In this scenario, non-class members may be invited to join the class related room. A notification may then be sent that allows a user to choose whether or not to join. In some instances, notifications may be sent to an individual even if the individual is not a registered user of the content management system. In some embodiments, the sharing of content to a room that would be of interest to an individual may be used to offer that individual the opportunity to join the content management system, service, and/or application that supports the room functionality. For example, photos that an individual appears in, or photos that may include content that may indicate that both the individual and the sharer of the photos have some shared affinity to (e.g., party at a sorority, family gathering, work event, etc.), may be shared with the individual as part of the offer to join the content management system. In fact, incentives may be provided to the member of the room sharing the photos to get the individual to join. In order to send such an individual a notification, he or she may be a contact of a registered user, and that contact's information may be obtained by a contact importer technology utilized by the content management system.

In exemplary embodiments of the present invention, a notification to any person may be sent in various ways. These may include, for example, email, SMS, or a message sent within a social media network, or any combination of these communications pathways. For example, in a social media network the notification may be sent as a message or as an email to that person's corresponding social media network email address, or both. In some embodiments a notification may include a link, a button that retrieves a link to a room, or any other relevant user interface within the content management system that is relevant to the notification. The notification may contain a link, which the recipient may use to see the shared photos, the room to which they have been shared, the room that has been named, etc. For notifications to a member of the room, or a user of the content management system who may not be a member of the room, room activity may be notified to such a user or member via an in-band notification, such as, for example, a notification tray in either the content management system application in general, or within a rooms application aspect of it.

In some embodiments, a notification functionality may include both SMS and email notifications, the ability to sign up to a content management system or an application or service thereof that supports rooms. In some embodiments, the notification may form an access control list, which may include various steps to make the signup process as seamless as possible.

In some embodiments, a member of a room may signal that she "likes" a post to the room. This may be considered a type of post in itself, and may be sent as a notification to the room members. To optimize bandwidth, if there are a lot of likes in a short amount of time (e.g., <10 minutes), the likes may be aggregated together. For example, aggregating by photo: "Person A and B like this photo" or "Person A likes Photos 1, 2, and 4." In some embodiments, mixes of photo and person aggregation may be implemented. In some embodiments, members may choose to see all likes within a room, and may also choose to disable them (this may be done globally, across all of that user's rooms, as well). In such case, different members of the same room may have different views of the room. For example, likes and posts to a room may only be visible in a room, and thus may not be associated with the snapshot of the photo or other content items as part of its metadata. Thus, a user may share a photo or set of photos to many rooms, and each one would have a different set of likes, comments and reactions, at the room level, but all such room would reference the same snapshot, which is stored in a "rooms" database, as described above.

More Advanced Features of Rooms

In some embodiments, if all of the members of a room, or the "mangers" of a room, may decide to delete content from a room, they may. For example, if a room is based on a set of cousins, aunts and uncles sharing photos from family gatherings. The room may be referred to as the "Thompson Family Gathering Room." Because the members of the room are all in attendance at the same events, all take photos and video at those same events, and/or all share their photos and video in the family room, it is highly likely that near duplicate content items will often be shared in the room. Several shots of the same person or activity are technically separate photos, and thus each stored on its own in the room data structure. However, to the human eye, many are nearly indistinguishable. To address such eventualities, and prevent the room from being overburdened with essentially redundant content, two approaches may, for example, be used. First, the members may be empowered to remove content items by vote, which may be unanimous, or a simple majority, for example. Second, as noted, a management group may be set up for a given room, and that group may be given the power to delete content. Finally, for example, a duplicate/near duplicate detection algorithm may be used to delete redundant content, as may be defined by one or more similarity indices. This may be a system default, for example, and may or may not be allowed to be member adjustable.

Similarly, in exemplary embodiments of the present invention, a similarity detector may, be used as a share recommender. In such exemplary embodiments, when a given user shares certain content with a room, the content management system may suggest to that user to also share content that is related, or very similar, to enhance the user's experience.

In some embodiments, an exemplary system that knows who is in a user's room and who the individual has been sharing photos with, may infer that the user has established a relationship with that person. Thus, if it is detected that the two people are in the same location, and they are taking photos at the same time, a prompt or suggestion may be made to the other person regarding sharing to a room. For example, by tracking that they both took photos at the same time and place, it may be inferred that they may be, or are, part of the same event. So, for example, if they went to Thanksgiving together, and one of the two shared photos of Thanksgiving, in some embodiments that data may be used to say, in effect "It seems like you were there too. Do you want to share your photos back into that room?" In such embodiments, an exemplary system may suggest ways that users may more easily share relevant content, which is a far superior experience than the other user having to realize "oh well, I actually was there too. Let me go back into my cameral roll and select the photos that I want to share with the room." For example, this may be optimized by sending a notification or query stating "Do you want to share your 26 photos too?"

In some embodiments, a system may actually assist or prompt a user to create a room. For example, by using photo tagging, and identifying who is in a given user's photos, an exemplary system may advise the user to share those photos with the person detected in them, and thus create a room. For example, if a user shares a photo with another user, and the system detects who is in the photo, it may, for example, prompt the user as follows: "You just indicated that you want to share this one photo. We actually know who is in the photo. Would you like to share the photo with him as well?" This functionality would rely on photo detection or face detection/face recognition, using known techniques. Another related feature that may be used in some embodiments is to create a facial profile for each person that is in a user's photos, and apply the facial profiles to filter any newly added photos so as to make sharing suggestions.

In some embodiments, for example, a subset of a room may be created. Technically, this is a new room, but based on the current room's contents. For example, a couple may have set up a room for sharing wedding photos with the guests of the wedding. If a couple has two hundred people at their wedding, for example, and the groom wishes to select the guests that were from his university and share more personal content, he may, for example, start a new room by initially grabbing all the people from the wedding room and then remove the ones that are not his university friends. Or, for example, a user may have nicely curated a set of photos from, for example, Thanksgiving, and decided to share the best ones with his parents. And then, he may want to share that same set of photos, with, for example, some other friends or his girlfriend. To support such functionality a user may, for example, take any of the posts that he posted in the room with his parents, and just share it again to another room.

In exemplary embodiments of the present invention, in addition to having content of rooms be permanent and available to all members at all times, a "sync to my account" feature may be provided. For example, if a user and his wife had a shared room together, it may be very likely that the user would always want her photos around, because they are so close, live together and their lives are very much intertwined. Thus, if, for example the user's wife tends to take most of the pictures of their children, the user likely wants her photos to be in his account on the content management system (and not just in a room with his wife which he may access). Thus, in such embodiments, a user may turn on a setting in a room that saves all photos, new or old, into his personal account on the content management system. This would create, for example, a continuous room of content automatically saved to his personal account, whenever new photos are added to that room. More granularly, for example, where the room has more members than just the wife, such a switch may only download content shared with the room by the wife. Alternatively, such a switch may be configured to only automatically download certain types of content shared by a single person. For example, using facial recognition, as described above, a user may set the switch to automatically download to his account all photos shared by his wife that contain their children.

In various exemplary embodiments of the present invention a user interface may contain the following features. Rooms may have an icon in a navigation bar, which yields a full view of all of a user's rooms when activated. The icon may be badged for new notifications with count of unique rooms with new notifications. Each room may show the last activity of the room and the person that posted that activity, when that activity happened, and it may also show the set of people in the whole room. A room may have an unread indicator, and within a room there may preferably be no paging (effectively infinite scroll on the UI side). In some embodiments, there may be an empty state when a user has no rooms, which may inform him what rooms are. In a room the members' names appear in the order added to the room. In some embodiments, at most two names may be shown, and then just "+<number more>." For activity in a room, the last activity (newest post) may be shown.

In various exemplary embodiments according to the present invention, a user may not make a new room from within a rooms view. In order to make a new room, one must start with content. In some embodiments tapping on a room goes to a room. In general a user may not delete rooms or reorder rooms, but may filter down or search for people or content in rooms globally, or within a given room. Posts are displayed in order of most recent activity (by others). This shows a user the items she has not yet seen. The same ordering may be implemented for messages and notifications. It is noted, however, that this causes content that a user may not care about to bubble up. Thus, in some embodiments, as noted, a user may "mute" persons, conversations, types of messaging (e.g., likes), etc., either globally or within a particular room.

Figure 2:
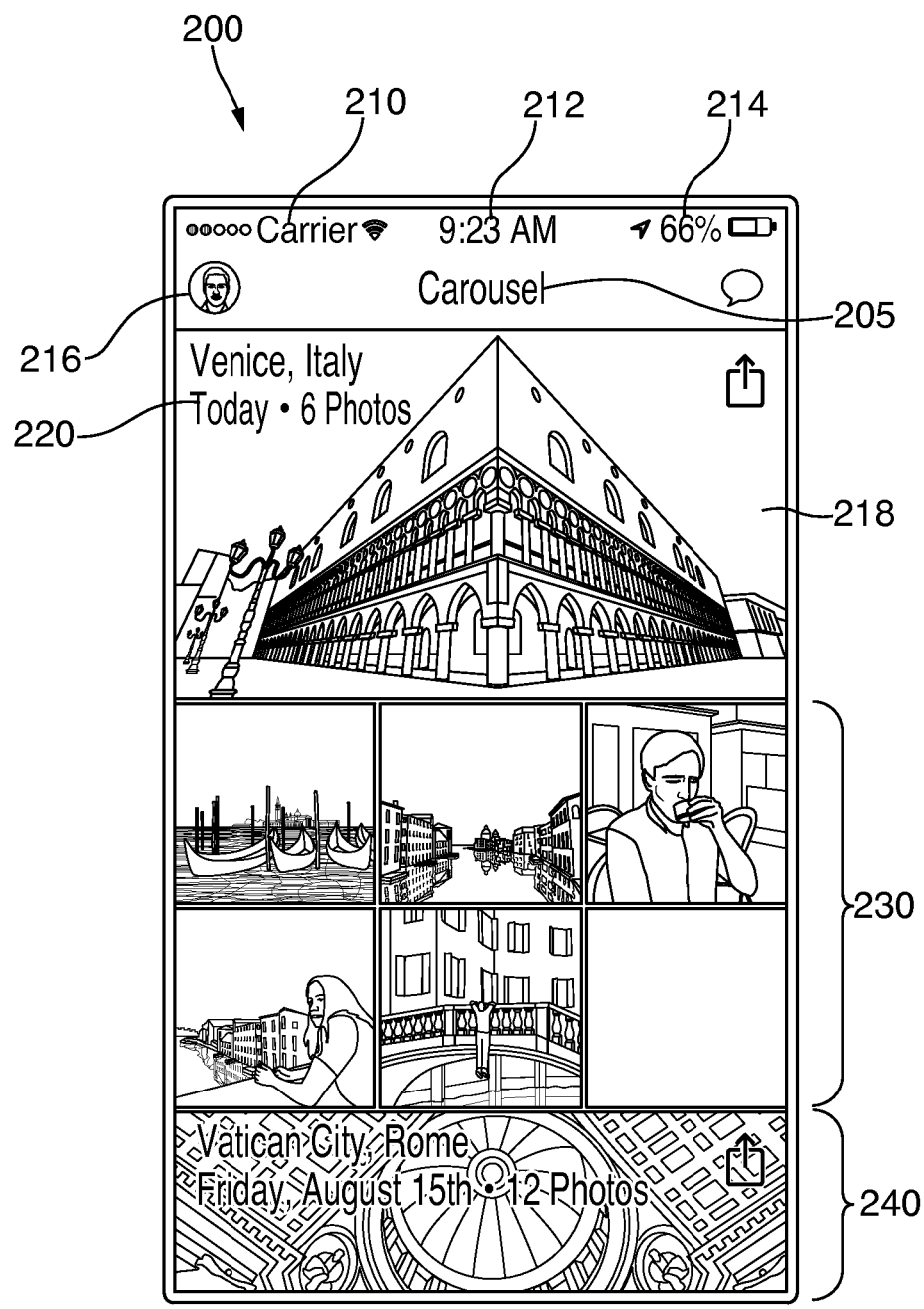
FIG. 2 shows a schematic illustration of an exemplary user interface displaying sets of content items stored on a mobile device in accordance with various embodiments.

FIG. 2 shows a schematic illustration of an exemplary user interface. In some embodiments, the displayed content items may be stored on the user device (e.g., client device 102) and/or within a user account on a content management system (e.g., content management system 100). In some embodiments, as here, user interface 200 displays the user's profile picture 216, and application title 205, as shown here "Carousel", to indicate to the user the current program and/or mode of the user interface and the application of which it is a part. User interface 200 may include content item collections 220 and 240, which each may include one or more content items. Content item collection 220 includes a main window image 218, as well as remaining images 230, as described below. Content items included within content item collections 220 and 240 may correspond to any type of image and/or video including, but not limited to, high-quality ("HQ") images, low-quality ("LQ") images, high resolution images, low resolution images, thumbnail resolution or thumb images, high-definition ("HD") images, panoramic images, mosaic images, short videos, short looping videos, movies, video clips, or any other type of image, or any combination thereof.

In exemplary embodiments of the present invention, content item collections 220 and/or 240 may be obtained from any suitable source. In some embodiments, a user may obtain content items via one or more image capturing components located on their user device. For example, one or more images and/or videos may be captured using camera 138. In some embodiments, one or more content items may be obtained from a received message or email. For example, a user may receive an SMS message from a contact, where the message includes a content item. The user may save the content item to their device, and the content item may then be displayed within user interface 200. In still further embodiments, the user may obtain one or more content items from a social media network, a website, a photo rooming service, and/or a content management system.

It is noted that of the two content item collections, there is one displayed in greater resolution than the other. This is content item collection 220, which has the identifier "Venice, Italy Today 6 Photos" as shown. In the depicted example of FIG. 2, this is the most recent collection acquired in this user's account. As noted, content item collection 220 actually includes the single content item in main window 218, as well as the remaining five content items shown at 230. Below this section of user interface 200 appears another collection, content item collection 240, entitled "Vatican City, Rome, Friday, August 15$^{th}$ 12 Photos."

In some embodiments, the user may share one or more of the content items within content item collections 220 and/or 240, as described more fully below. For example, the user may share selected content items with one or more of the user's contacts, one or more social media networks, and/or a content management system. Such sharing will create a "room," as described above.

Figure 3:
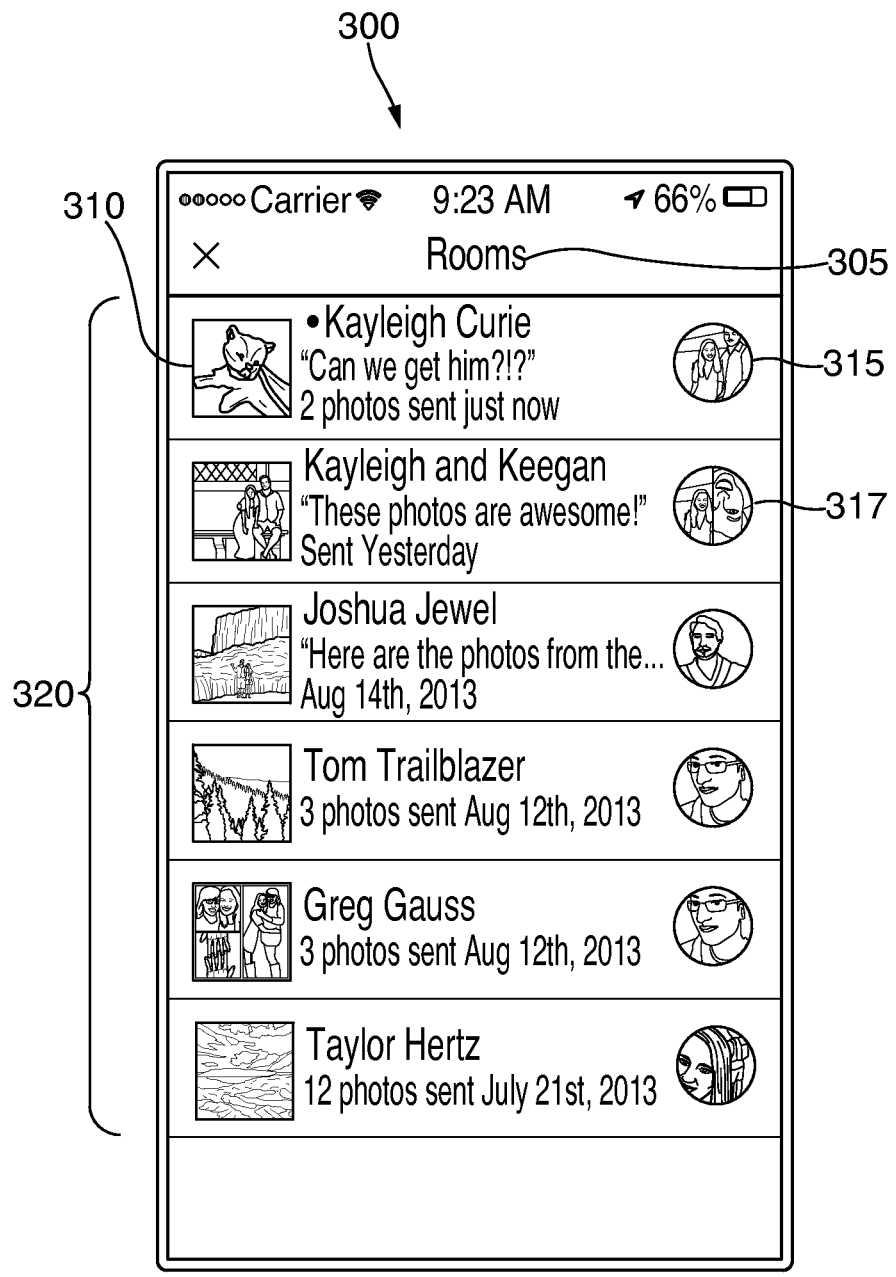
FIG. 3 shows a schematic illustration of a user interface displaying six exemplary rooms in accordance with various embodiments.

FIG. 3 shows a schematic illustration of a user interface 300 displaying a set of current rooms 320 of which the user is a member. Each room may, for example, be identified by its members other than the current user, and may display the last post within the room. Each room thus occupies an area of user interface 300, with three sub areas—from left to right: last picture posted, room name and last message/last activity, and profile picture. The rooms may be presented in reverse chronological order of updated content. Thus the room "Kayleigh Curie," to which two new photos have just been added, appears on the top of the room listing, and the room "Greg Gauss," which was updated sometime prior, appears at the bottom of the listing. As noted, at the left of the rectangular area may be displayed the most recent content item or photograph 310 that was posted to the room. In the center may be displayed the last message posted to the room, if any, and if not, the last activity, and at the far right may be displayed a profile picture, such as profile pictures 315, 317, by which the room may be identified. Because this user interface displays the current rooms the user has access to, the interface identifier 305 reads "Rooms," for example.

It is noted in connection with room profile pictures 315, 317, that when one other person is a member of the room, as shown at 315, their profile picture may be displayed to identify the given room. However, where a room has multiple members, such as the "Kayleigh and Keegan" room, then a composite room profile picture may be displayed, as shown in profile picture 317, which has a "split screen" effect, with each other member's profile image displayed in half of the circular room profile picture. If there is no last comment posted in a room, such as is the case with the bottom three rooms "Tom Trailblazer," "Taylor Hertz," and "Greg Gauss," then only the last activity is displayed. A composite picture for a room may be limited to including 3, or 4 members, so as to be tractable, and recognizable.

Figure 4:
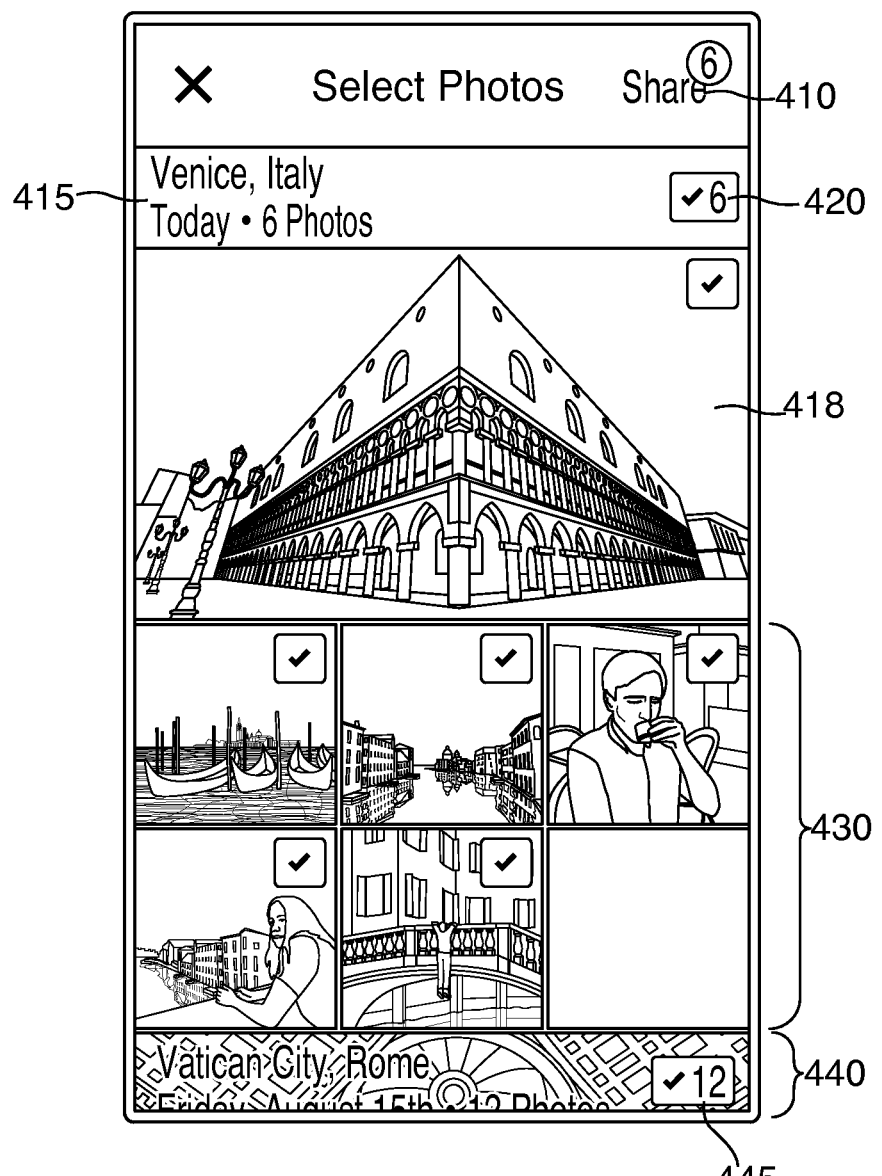
FIG. 4 shows a schematic illustration of the user interface of FIG. 2 where a user has selected six content items from a set for sharing in accordance with various embodiments.

FIG. 4 shows a schematic illustration of the user interface of FIG. 2 in a grid selection mode after a user has selected. For example, the user may have selected six content items, shown in collection 415 "Venice, Italy Today," for sharing. Thus, "Share" indicator 410 may indicate that six (6) content items have been selected for sharing. In an exemplary selection/sharing mode as shown in FIG. 4, each collection may include total count box 420 and/or 445, indicating how many content items are in the collection. In the depicted exemplary grid selection mode, each photograph may have, for example, a check box, which may be located in a top right corner and may indicate that each photograph may be selected. If the user selects a photo, a check box in the upper right corner of each photo may be filled in by a solid color to indicate that the photo has been selected. If the check box is not filled in, the photograph may subsequently not be selected. Any indication of a photograph being selected may be used, and the use of a check box is merely exemplary. The selected six content items described above may correspond to all of the content items from collection 415. Below, interface area 430 may be seen including collection 440 "Vatican City, Rome Friday, August 15th" and its indicator 445 may inform the user that the collection includes twelve (12) photos, and that they are also available for selection.

Figure 5:
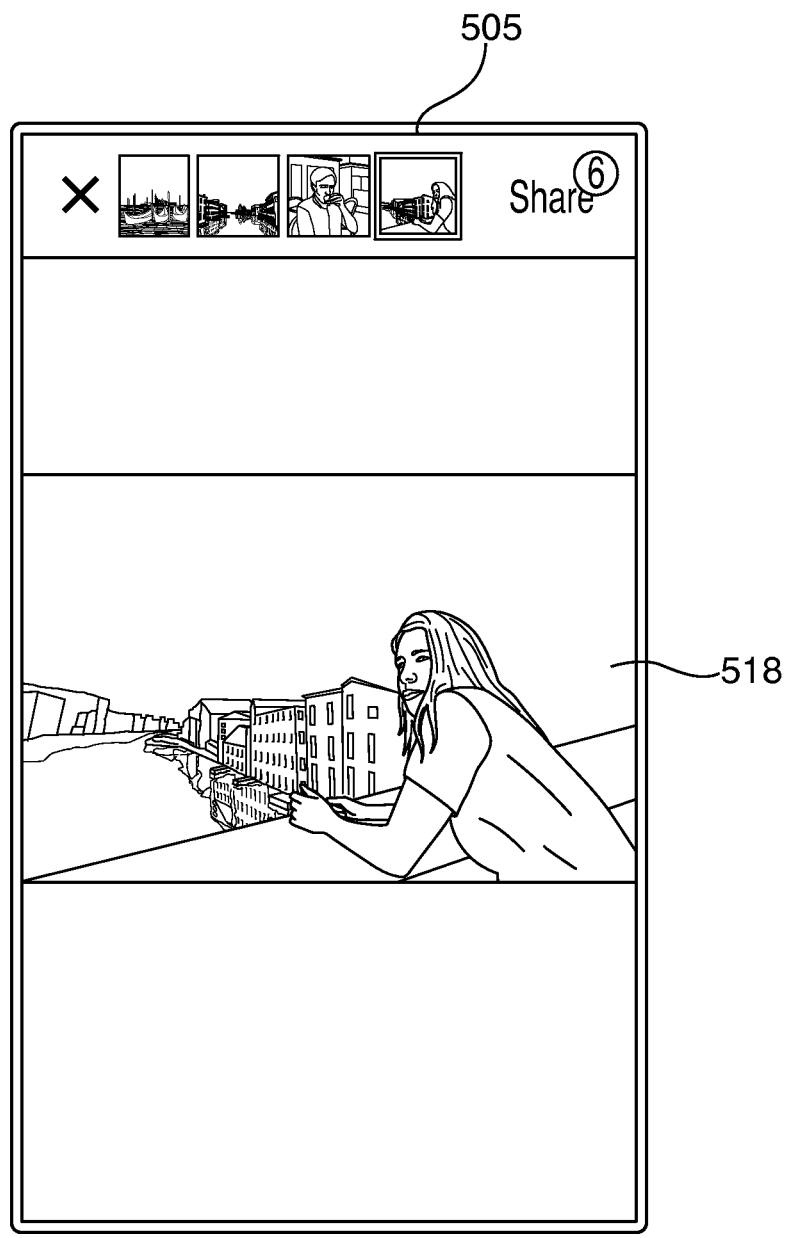
FIG. 5 shows a schematic illustration of a user interface displaying one of the exemplary content items that was selected for sharing, and a corresponding share bar being displayed at the top of the user interface, in accordance with various embodiments.

In general, in exemplary embodiments of the present invention, a user may select one or more content items from various collections using any suitable means, as previously mentioned. In response to the user switching from a collections display mode to a selection mode, one or more features of the user interface may change. For example, there may be a user interface similar to 200 of FIG. 2, which may correspond to a grid view of a set of a user's photographs. The user may, for example, use a gesture, or an interactive button to select some of the figures, and then perform another gesture, or interact with a "share" button, and be presented with a user interface such as is shown in FIG. 5. At the top of FIG. 5 is a share bar, and one of the photos 505 in the set shown in the share bar may be selected, as indicated by the frame around the edges of the photograph. The selected photo is also shown in the main window 518, and if desired can be shared with one or more contacts of the user to create a room or add to a room.

Figure 6:
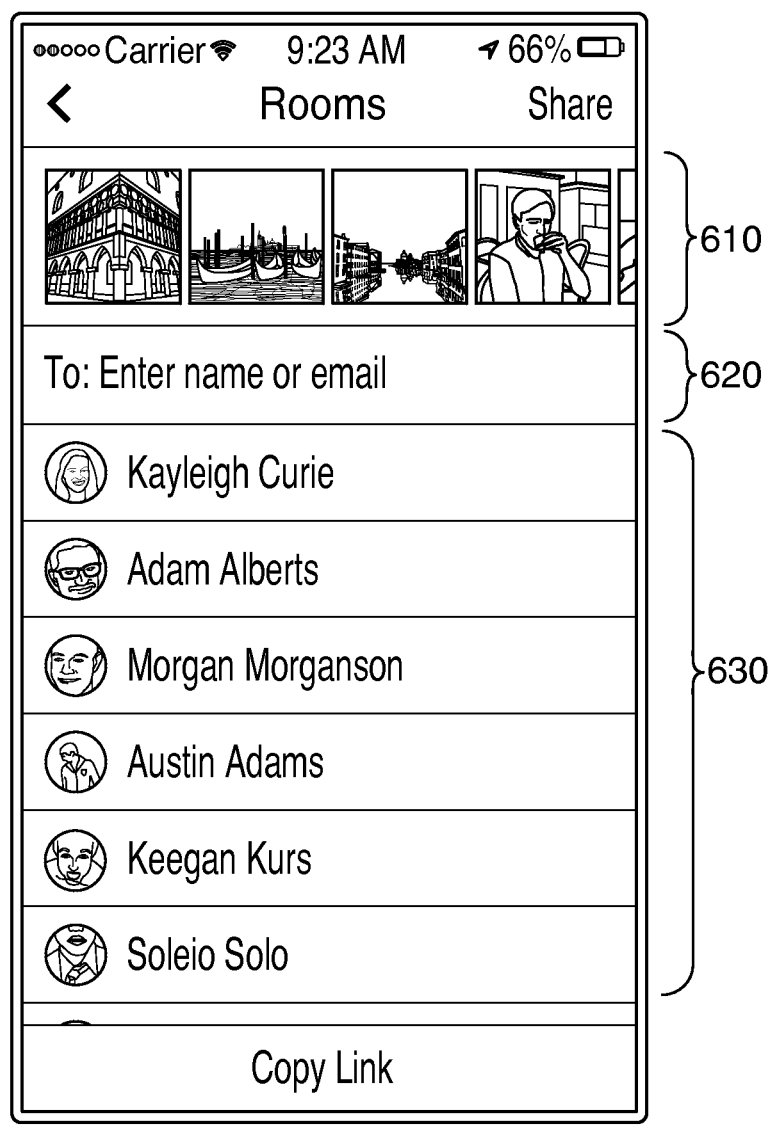
FIG. 6 shows a schematic illustration of a "rooms" user interface displaying various contacts of the user with whom a selected content item may be shared in accordance with various embodiments.

FIG. 6 shows a schematic illustration of a "Rooms" user interface displaying various contacts of the user with whom a selected content item may be shared in accordance with various embodiments of the present invention. This user interface may naturally follow that of FIG. 4, for example, or that of FIG. 5, for example, after a user has selected several content items for sharing. The user interface of FIG. 6 continues with the example of FIG. 4, and thus presents the six photographs of collection 415 ("Venice, Italy Aug. 13, 2013") at 610 for sharing with one or more of the contacts listed 630, or a new contact to be entered at 620. In this example the contact list includes the name of the contact, and, as shown, their profile picture.

Figure 7:
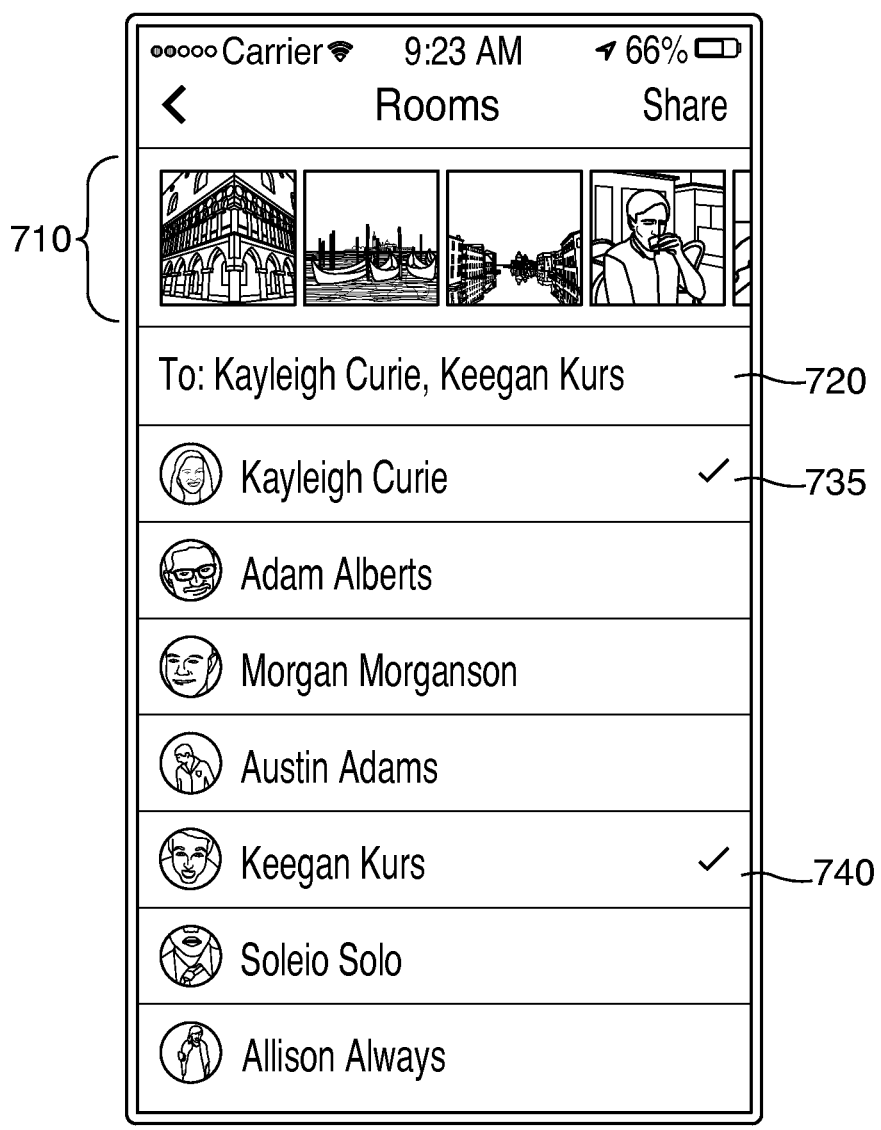
FIG. 7 shows the schematic illustration of the "rooms" user interface of FIG. 6 after the user has selected two contacts with whom to share an content item (thus check marks appear near the names of those contacts) in accordance with various embodiments.

FIG. 7 shows the schematic illustration of the "Rooms" user interface of FIG. 6 after the user has selected two contacts with whom to share the selected content item, "Kaleigh Curie" and "Keegan Kurs." This selection may be made by checking each of these contacts, at 735 and 740, and thus their names appear in the "To:" line 720. Persons of ordinary skill in the art will recognize that various symbols and means of indicating a selection of a "share" may be used, and the aforementioned is merely exemplary.

Figure 8:
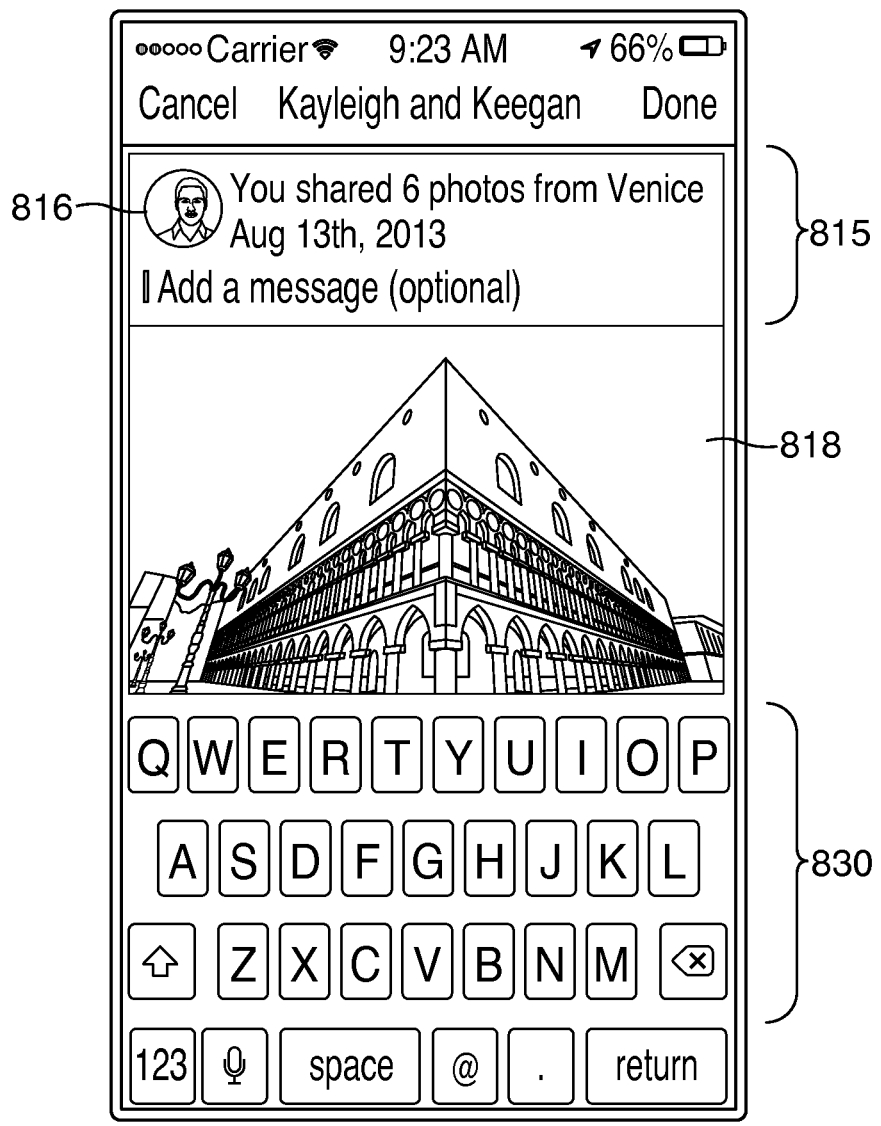
FIG. 8 shows the schematic illustration of a follow-up user interface to that of FIG. 7, within the "room" known as "Kayleigh and Keegan", where the user is informed that six content items were shared from the event known as "Venice Aug. 13, 2013", and is further prompted to add a message to the room, if desired, in accordance with various embodiments.

In response to the selection of "sharees" as shown in FIG. 7, FIG. 8 shows the schematic illustration of a follow-up user interface to that of FIG. 7, within the newly created "Room" known as "Kayleigh and Keegan." The name of the new room may be displayed as the user interface title or caption. The user may be informed in informational bar 815 that six content items were shared to this room from the collection known as "Venice Aug. 13, 2013," and the user may be further prompted to add a message to go with the shared photos, if desired, in accordance with various embodiments. As seen in FIG. 8, the profile picture of the user 816 (who has just done the sharing) may be shown within informational bar 815, and below that the first content item of the set that was shared, at 818. At the bottom of the user interface, a virtual keyboard 830 may be displayed to facilitate the user entering an optional message. At the top may be a title bar including active buttons "Cancel" and "Done," which may be used to either cancel, or indicate that the message is now complete, at which point (in either case) virtual keyboard 830 may be removed.

Figure 9:
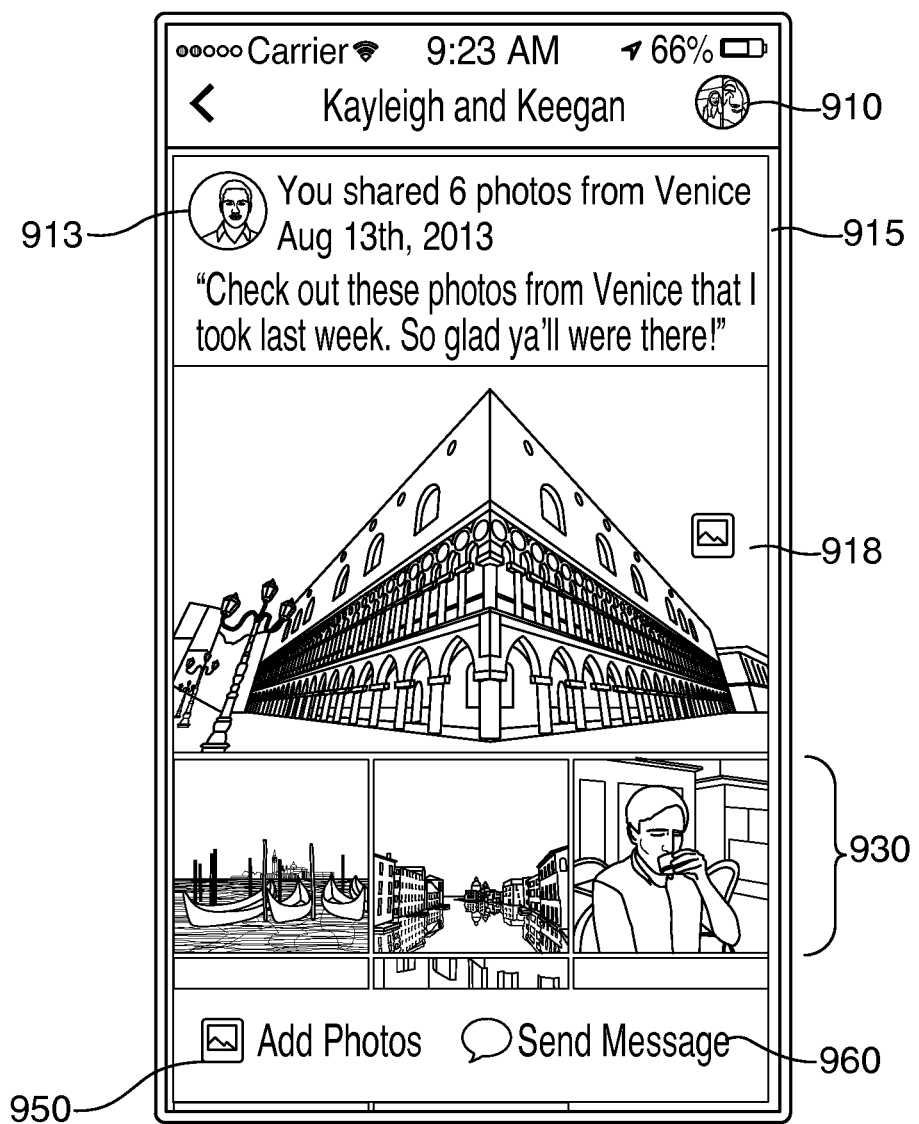
FIG. 9 shows the schematic illustration of a follow-up user interface to that of FIG. 8, where the user has added a comment to the "room" (via, for example, the keyboard of FIG. 8), which now appears in the interactive window in accordance with various embodiments.

FIG. 9 shows the situation where the user did in fact enter a message when prompted, as shown in FIG. 8. The message is shown in informational bar 915, and reads "Check out these photos from Venice that I took last week. So glad ya'll were there!". The user's profile picture is shown at 913 so it is clear who the system understands to be, and will identify to the room, as the "sharer." This is a typical example of the benefit of rooms, where three people shared a common vacation or trip to a given venue, and one or more of them took photographs and/or video. After the trip is over, there may be a desire to share these photographs and/or videos with each other, and to be able to return repeatedly to the "sharing space" to view them, show them to other friends, discuss or comment upon them, etc. At the bottom of the user interface of FIG. 9, the user has available two active buttons, 960 to send the message, akin to a "send" button in an email client, and 950, an "Add Photos" button, which allows the user to add additional photos to this room.

Figure 10:
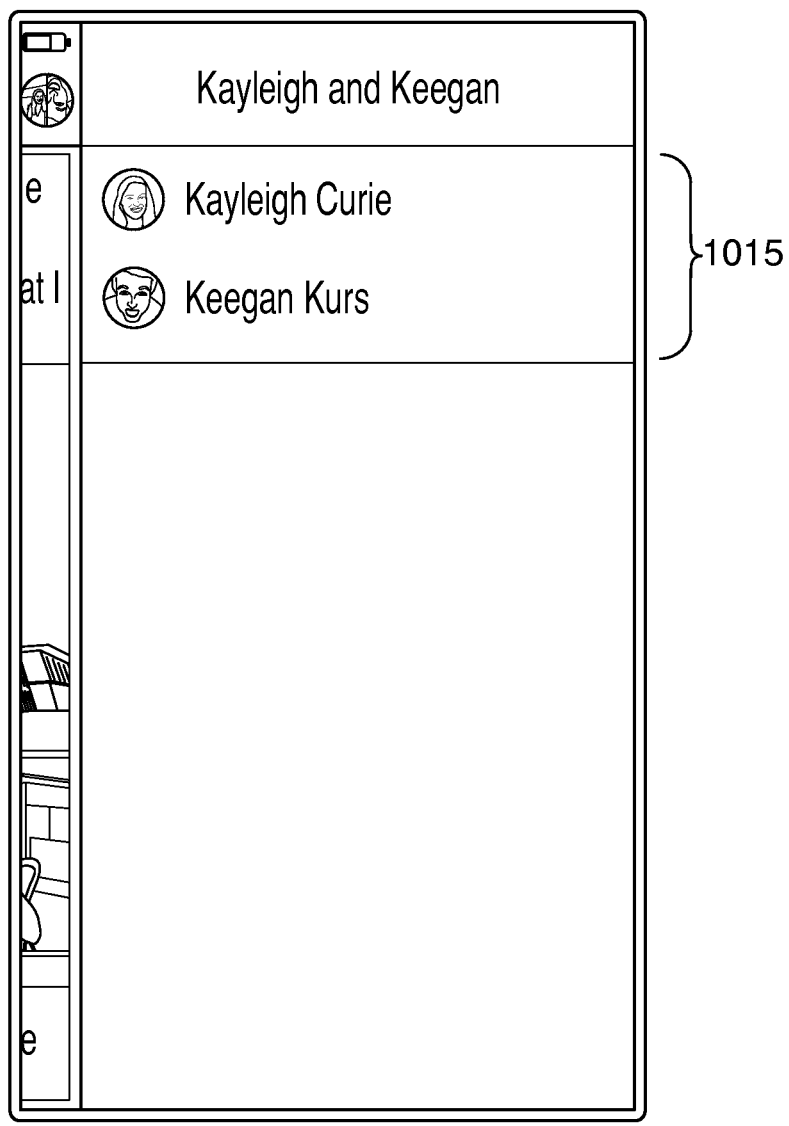
FIG. 10 shows a schematic illustration of a "rooms" user interface, here the "room" known as "Kayleigh and Keegan", displaying the members of the room, listed by name and profile picture, in accordance with various embodiments.

FIG. 10 shows a schematic illustration of a "Rooms" user interface, here the "Room" known as "Kayleigh and Keegan", displaying the members of the room at 1015, listed by name and profile picture, in accordance with various embodiments.

Figure 11:
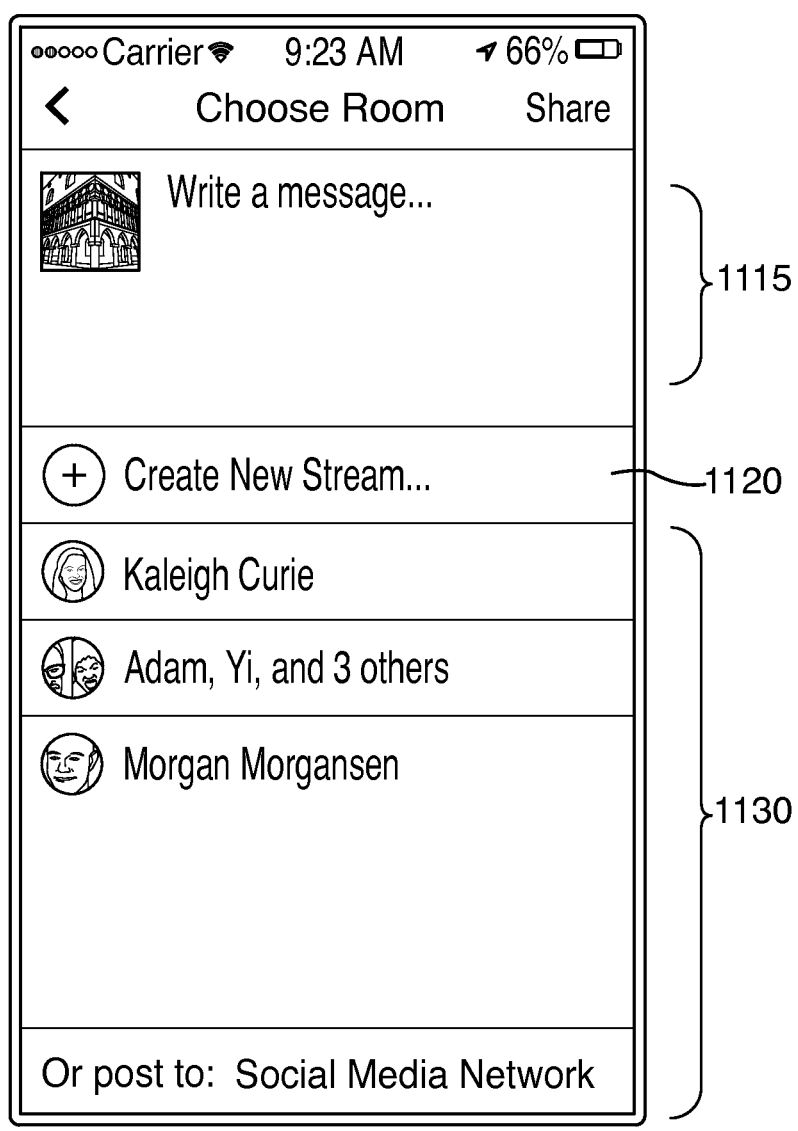
FIG. 11 shows a schematic illustration of a general "rooms" user interface, listing the various rooms available to the user as well as a "Create New Room" active button, in accordance with various embodiments.
Figure 12:
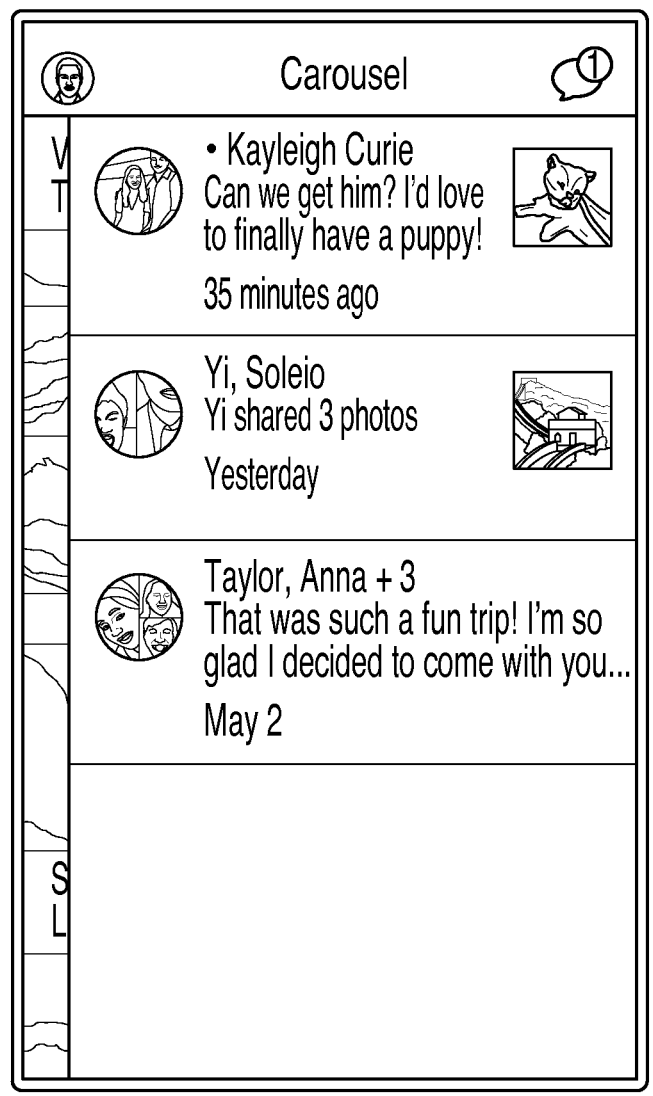
FIGS. 12 and 13 show two variants of an exemplary illustrative screen shot of a list of rooms in accordance with various embodiments.
Figure 13:
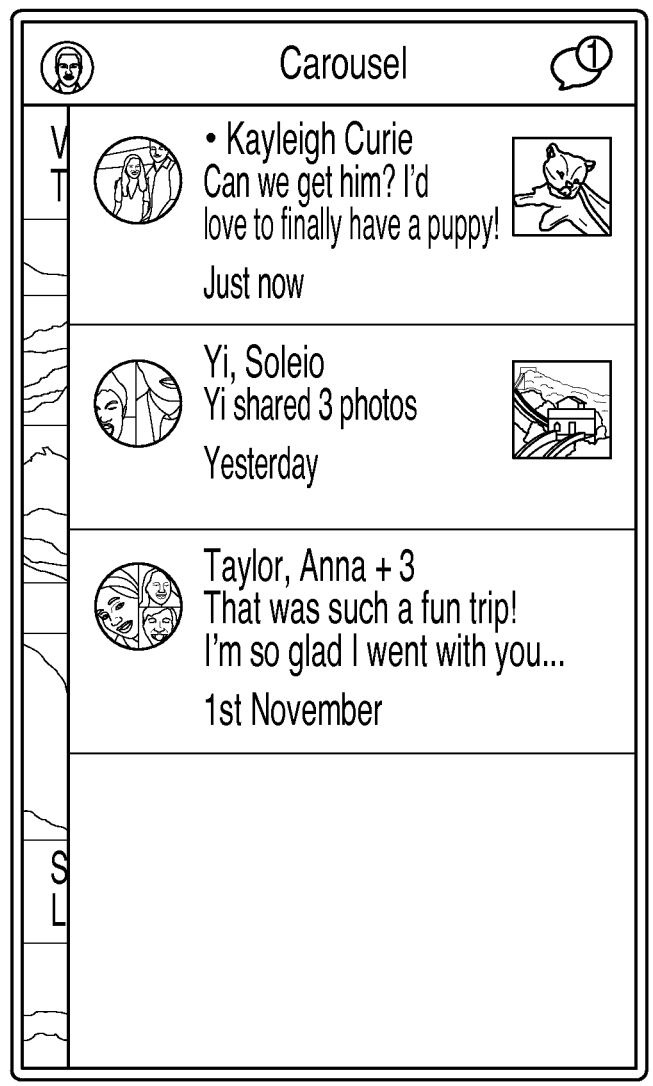

FIG. 11 shows a schematic illustration of a general "Rooms" user interface, where a user has selected a content item and may desire to share it with one of his or her rooms. Continuing with the example of FIGS. 2-10, the exemplary user has selected the first photograph from collection 220 from FIG. 2, shown at 218, for sharing with a room. Thus, a low-resolution version of that image may be shown in informational area 1115, with a "Write a message" prompt. At 1130 the available rooms to which the image could be added are listed, and at 1120 is a button "Create New Room" facilitating the creation of a new room, if desired. The available rooms listed at 1130, when involving multiple members, display a composite profile picture for the room, as is seen, for example, in the room "Adam, Yi and 3 others." Here, for example, the profile picture contains the users "Adam" and "Yi" only. This is because the room was originally created by users "Adam" and "Yi", and subsequently three other users were added. In this exemplary embodiment, once a room profile picture is created, it remains even if additional users are added later. In other exemplary embodiments, this need not be the case, and the profile picture may dynamically morph as members are added or leave a given room. FIGS. 12 and 13 depict two variants of exemplary screen shots of user interfaces as they may really appear, so that the detail and real world "look and feel" may be appreciated.

FIGS. 12 and 13 show exemplary screen shots of a "Rooms" user interface according to some embodiments, as may be actually displayed on, for example, a smartphone. The two figures are variants of the identical screen, the only difference being how the information at the top of the interface is displayed. Two of the listed rooms have multiple members (i.e., "Yi, Soleio" and "Taylor, Anna +3"), and thus illustrate the composite profile picture well. Even at this small size, there may be considerable detail in the profile picture of each room, and this may, in some embodiments, enhance the personal felling a user has when interacting with a room. Conventionally, users of content management systems have a sense of interacting with the system. Users of a rooms application or functionality have a sense of interacting with their friends.

Figure 14:
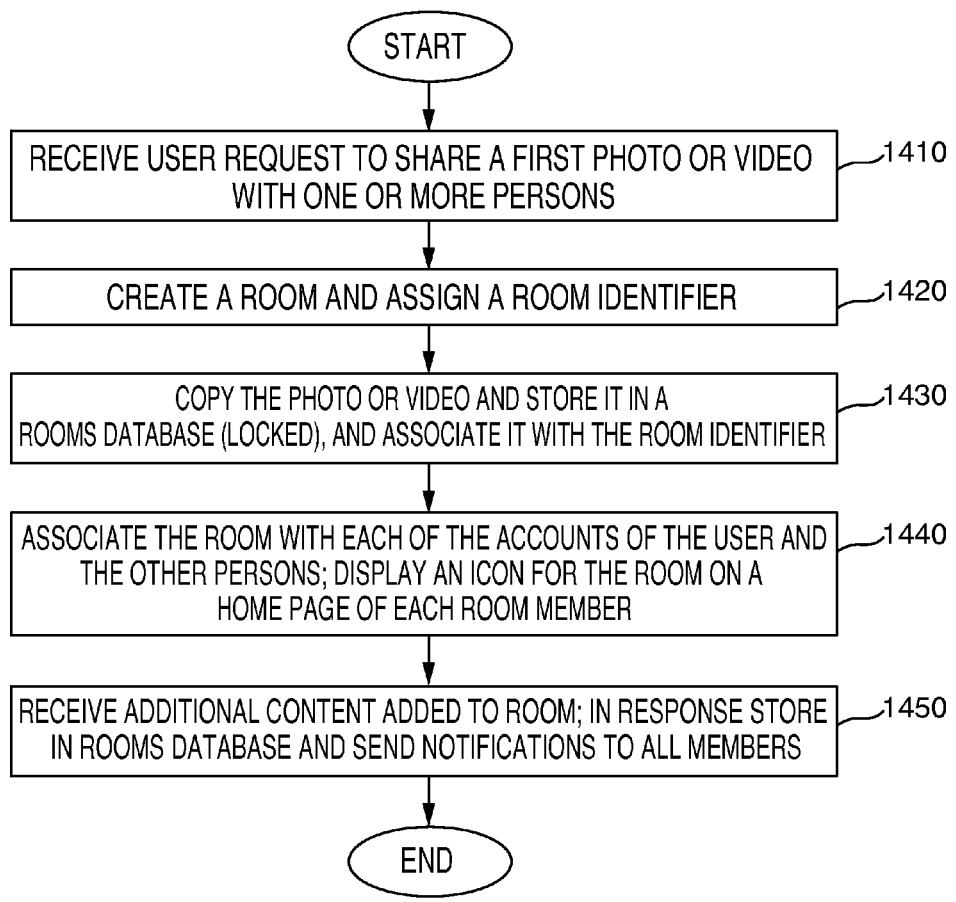
FIG. 14 shows an illustrative flowchart of a process for creating and providing rooms in accordance with various embodiments.

FIG. 14 shows an illustrative flowchart of a process for creating and providing rooms in accordance with various embodiments of the present invention. The process of FIG. 14 may run on a user device, for example, and may communicate with a server of a content management system, where global data and data identifiers are stored. With reference to FIG. 14, following start, at 1410 the process may receive a user request to share a first photo or video with one or more persons. As noted above, "persons" may, depending upon the embodiment, include registered users of the content management system, or other parties as well. Upon receipt of the request, at 1420 the process may create a room and assign a room identifier.

It is noted at this juncture that room identifiers as well as content item identifiers may be local, i.e., only known and referenced on a user device, or may be global, and thus known and used on the content management system server as well as on the user device. The implications of which type of identifier is created thus depend upon the connectivity then prevailing between the user device and the server. In one embodiment, a local identifier is always first assigned by a client application running on the user device, and an essentially simultaneous request for a global identifier sent to the server. The local identifier is then replaced by the global identifier as soon as it is received. Under full connectivity, the local identifier thus has a very short lifespan, and essentially all interactivity on the user device references the global identifier for the room or any content item in the room.

Under more intermittent connectivity, numerous operations on the user device may occur (e.g., shares, likes, comments to, etc.) referencing the local identifier until the global identifier becomes known, and is then used to replace every instance of the local identifier in a process or queued instruction or task. For the purposes of FIG. 14 either type of identifier may be used, it being assumed that ultimately all local identifiers are short-lived and replaced by global identifiers.

Continuing with reference to FIG. 14, at 1430, the photo or video which was the subject of the share request at 1410 may be copied to the newly created room, by storing it in a rooms database, thus locking it from further modification by its sharer, and associating it in the rooms database with the room identifier. The rooms database may be thought of as a basic data structure which a rooms application draws from when displaying various rooms to each member. It may be logically conceived of as a database with a number of records, each record being a room. However, in reality, a content item would normally only be stored once in the rooms database, and if it was shared to many rooms, the record of each room would contain a reference to the single content item.

It is understood that a content item stored in a user's account on a content management system is readily modifiable, and even subject to deletion by that user. For that reason, in order to "freeze" or "lock" such a content item once added to a room, a second database, different than that which, for example, serves the standard user accounts on the content management system, the rooms database, may be used. Any content item, once added to the rooms database, is no longer under the control of the user that shared it, or added it to a room.

At 1440 the newly created room may be associated with each of the members, by associating it with the accounts of the creator and the original sharees. Once this is accomplished, the room and its then contents may be displayed on the home page (or root directory) of each member, in similar fashion to the rooms shown in FIGS. 3 and 6, for example. This may be implemented in various ways. For example, within the rooms database a data structure for each room may be created, with references to every content item—also stored in the rooms database—associated with that room. Additionally stored in the room data structure may be the identification numbers of each member, and the icon format to be displayed on each member's account, depicting the room, in the various possible formats as described above. At 1450, upon receipt of additional content added to a room, the content may be stored in the rooms database, and a notification sent to all members of the room, for example. As noted above, in certain embodiments notifications of room activity may be sent to other persons as well, including users of the content management system and even non-registered users, for various purposes.

Maintaining Full Functionality on User Device Regardless of Connectivity

As noted above, in various exemplary embodiments of the present invention, rooms may be ultimately managed from a server of a content management system. However, as further noted, in such exemplary embodiments a client application of the content management system runs on a user device, which is in communication with the server over a data communications network. While it is highly desirable for the user of the user device to be able to experience a seamless response of the system to (i) the creation of rooms, (ii) the addition of photos or messages to an existing room, (iii) the downloading of content from a room to a personal account within the content management system, and (iv) other responses to his or her interactions with the application, this is not always possible. This is due to the fact that while the connectivity on a user device between the user interface and the underlying client software is permanent, the connection between the underlying client software and the remote server may often be intermittent.

In some embodiments, a room may be managed with reference to a unique index number or identifier assigned or associated with the room. In standard content management systems each user may be assigned a unique identifier, and all content and interactions of that user utilize the unique identifier to allow the content management system to properly store content items in his or her account, as well as store and implement various supported interactions.

Whether a user creates a room by initiating a share, or adds content to a room, to the server the operations may appear equivalent, except that in the latter case a Room ID may already exist while in the former case there may be no Room ID when the share is made. When a user first creates a room, a request for a Room ID is sent from the underlying client software over the data network to the server of the content management system. If the client application has to wait until the Room ID is in turn received back from the server, it cannot create the room, and thus cannot show the content within the room, until the Room ID is received. This may likely cause wait states and latency if the connectivity between client application and server is intermittent. In order to create the experience on the user device of full local functionality, the fundamental problem that must be solved is how to prevent a weak or intermittent data connection from interfering with what the user is actually seeing. So once the user, via the user interface, injects requests, and queues tasks, within the underlying software, to preserve local functionality to the extent possible, these actions must be reflected back into the user interface even if the server has not acknowledged the actions or fulfilled or processed the requests.

For example, a user, while offline, may create a room. The user may take multiple photos, click share, add a person, which may send a message to the underlying software to create a room. At that point the client software may attempt tell the user interface that there is a new room created, and while it does that, it will also in parallel tell the server that a new room has been created. However, the server might not be accessible at the time. Nonetheless, if in such a scenario the user adds a comment to a room, it may be necessary to show the user the comment in that room even if the request has not yet been sent to, or has not yet been processed on, the server.

Thus, even if connectivity is still intermittent or weak, in exemplary embodiments of the present invention the user may nonetheless have a smooth and nearly seamless local experience. In such exemplary embodiments it can be guaranteed that creating a room will always succeed. In such embodiments, although at some point the client application is going to send the "create room and assign Room ID" message to the server, what it may do in the meantime is simulate the new post. For example, the client software creates a local ID and a new post table (a table that manages which posts are in a room, which rooms there are, etc.). The client software creates these results locally, as if the new room existed globally, and as if the content was really posted to a room. Once the server responds, in order to maintain seamless interaction on each user device, the actual (global) Room ID must be associated with the local room ID, and the local room ID replaced by the actual (global) room ID in such a way so as not to execute any local action twice, or not at all. Thus, if a local room ID is included in a queued instruction, the switch of IDs must occur either while the instruction is in a queue, but not yet executed, or after execution, but not during execution, which may create an ambiguity. For example, assume a user takes some photos with a smartphone on which she also has a rooms application running She uploads the photos to her content management account, and shares them with her sisters—but does not add them to the room that she and her sisters have. Assuming that in this embodiment multiple rooms are allowed between the same audience, this new share may create a new room. Assume further that, throughout this process, her smartphone is not connected to the content management system's server, due to network issues. Because the photos have not been uploaded to the server, but were added to her account locally, and then added to a room locally, these photos and the new room all have only local IDs. The tasks of requesting IDs for each of these items and the room, and the task of adding the items to the room are thus queued, and executed locally. If connectivity resumes to the server while some of these instructions are in the process of being implemented, it is necessary to manage the replacement of local IDs with the actual (global) IDs so that no task is dropped, and no task is performed twice, once referencing the local ID and a second time referencing the actual ID.

In this context, an interesting case arises where two offline users take related or connected actions. Since rooms are defined by the members in the room chosen by the "sharer," it is possible that two users A and B are both on their respective smartphones, and that they both share photos with each other, while both are also offline. On each user's smartphone it will thus appears as if that user created the room "A and B," and shared content with the other. Then, after connectivity returns, the messages are going to race each other to the server and there is no guarantee which will get there first. Thus, in such exemplary embodiments, a mechanism may be put in place to resolve the conflicting local actions when the global action is ultimately implemented at the server. For example, using timestamps in the event of a race condition, the first action to be taken by a user no matter when they may be received at the server may control, or the first action received at the server may control. As another example, more trivial resolutions based on details of the two users, such as age of registered account with the content management system, standard or premium membership, level of activity, zip code, alphabetic order of last names, etc. The problem may be further exacerbated with more than two users. For example, if there are four users, (e.g., A, B, C and D), and they each share photos with the other three, one room is created, but each believes he has created it. In embodiments where any member can change the name of a room, or where the initial creator names the room, the server will have a 4-way race condition.

In the event of such a race condition, upon ultimate resolution at the server, notifications may be automatically sent to each of the members in the room, via one or more of the communications channels described above, explaining the race condition and how it was resolved, and therefore why the remaining members, besides the one who won the race, see a different name and a different order of posts to the room than they had each originally seen on their user devices. Such notifications may contain a link to the room as ultimately implemented on the server so the users may see its final form and state.

Figure 15:
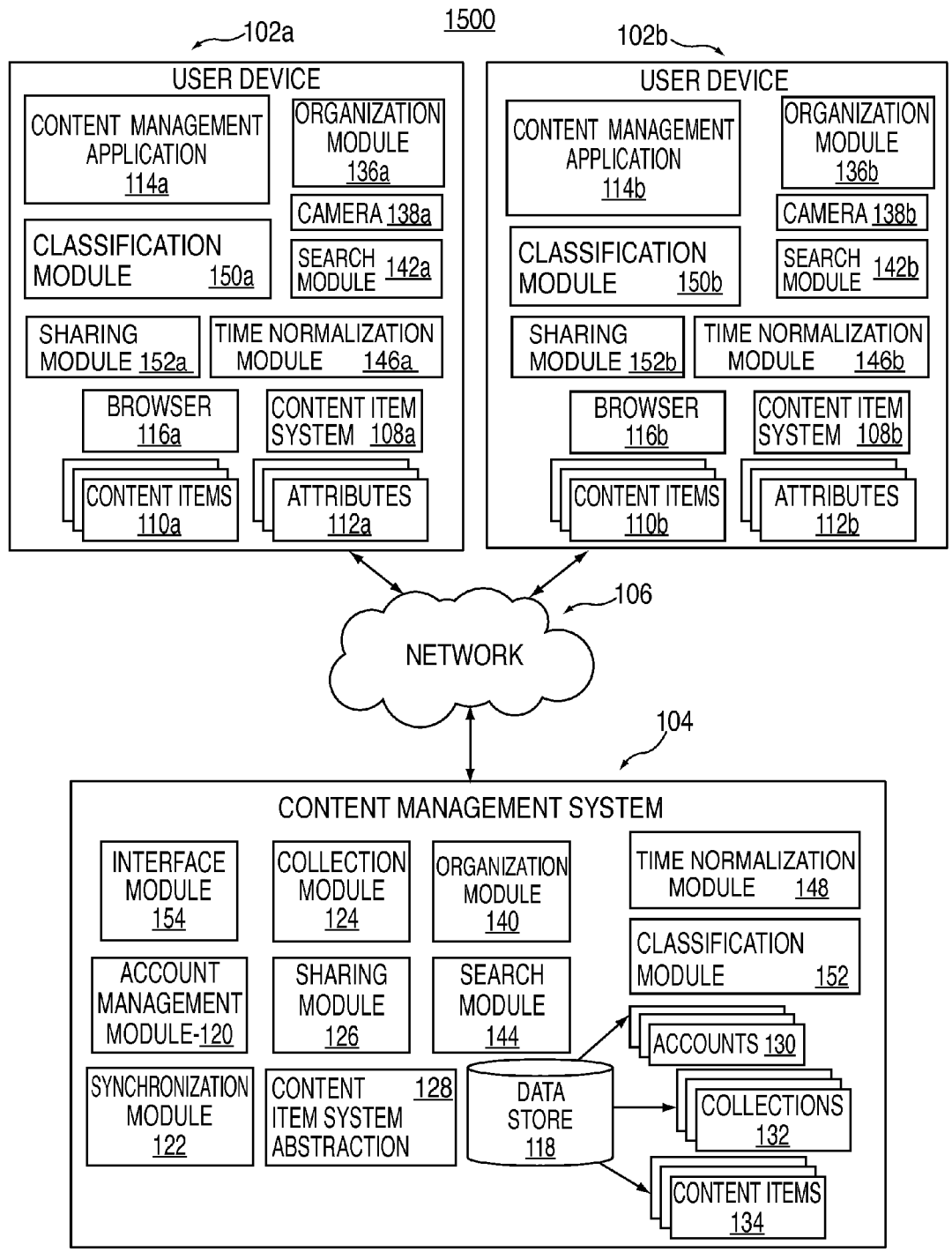
FIG. 15 shows another exemplary system in accordance with various embodiments.

FIG. 15 shows an exemplary system in accordance with various embodiments. In some embodiments, system 1500 of FIG. 15 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true.

A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for providing shared virtual spaces, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method comprising:
receiving, at a user device from a user, a share request comprising at least one contact of the user and a content item;

creating, locally on the user device, a shared virtual space to store the at least one content item;

displaying, at the user device, the shared virtual space comprising the content item, wherein the user can interact with the content item prior to a global version of the shared virtual space being created;

sending, to a content management system, data to create the global version of the shared virtual space;

assigning a local identifier to the shared virtual space prior to receipt of a global identifier for the global version of the shared virtual space from the content management system;

receiving, from the content management system, the global identifier for the global version of the shared virtual space; and replacing, at the user device, the local identifier with the global identifier.

2. The method of claim 1, further comprising:
detecting, at the user device, user interactions with the content item within the shared virtual space; and
sending data associated with the user interactions to the content management system to be applied to the global version of the shared virtual space.

3. The method of claim 1, wherein a copy of the content item is stored in the global version of the shared virtual space on the content management system.

4. The method of claim 1, wherein the content item is one or more of:
stored on the user device; or
stored in a user account on the content management system.

5. The method of claim 1, wherein:
the shared virtual space and the global version of the shared virtual space are data structures; and
the data structures allow content items to be presented on the user device in a defined order.

6. The method of claim 1, wherein the at least one contact comprises one or more of: registered users of the content management system or non-registered users.

7. The method of claim 1, wherein the shared virtual space is locked after the content item has been added to prevent removal of the content item from the shared virtual space.

8. The method of claim 1, wherein one or more of the user or the at least one contact is permitted to add new members to the shared virtual space.

9. The method of claim 1, further comprising:
providing a notification to one or more of the user or the at least one contact.

10. The method of claim 9, wherein the notification is sent in response to one or more of:
a content item being added to the shared virtual space;
the global version of the shared virtual space being created; or
a name of the global version of the shared virtual space being inputted.

11. The method of claim 9, wherein the notification is sent in response to one or more of:
the user being added to an additional shared virtual space;
additional content items being added to one or more of the shared virtual space or the global version of the shared virtual space;
an additional contact being added to the global version of the shared virtual space; or
a new message being added to one or more of the shared virtual space or the global version of the shared virtual space.

12. The method of claim 1, further comprising creating the shared virtual space on the user device regardless of connectivity with the content management system.

13. The method of claim 12, further comprising providing full functionality of the shared virtual space to the user regardless of connectivity with the content management system.

14. The method of claim 1, further comprising associating future communications associated with the shared virtual space with the global identifier.

15. The method of claim 1, wherein displaying the shared virtual space comprises displaying the shared virtual space prior to the global version of the shared virtual space being created and without limiting any functionality of the shared virtual space prior to the global version of the shared virtual space being created.

16. The method of claim 1, further comprising:
analyzing the content item to identify one or more characteristics of the content item;
analyzing additional content items stored on the user device to identify one or more additional content items sharing the one or more characteristics; and
providing a recommendation to add the one or more additional content items to the shared virtual space.

17. The method of claim 1, further comprising:
displaying a user interface comprising a plurality of content items and a listing of a plurality of contacts of the user,
wherein receiving the share request comprises receiving, by way of the user interface, a selection of the content item from the plurality of content items and a selection of the at least one contact from the plurality of contacts.

18. A method comprising:
receiving, at a user device from a user, a share request comprising at least one contact of a user and at least one content item;
creating, locally on the user device, a shared virtual space to store the at least one content item;
detecting a post being added to the shared virtual space by the user at the user device;
displaying, prior to a global version of the shared virtual space being created, the at least one content item and the post to the user on the user device;
sending, to a content management system, data to create the global version of the shared virtual space at the content management system, wherein the global version of the shared virtual space comprises a copy of the at least one content item and a copy of the post;
assigning a local identifier to the shared virtual space prior to receipt of a global identifier for the global version of the shared virtual space from the content management system;
receiving, from the content management system, the global identifier for the global version of the shared virtual space; and
replacing, at the user device, the local identifier with the global identifier.

19. The method of claim 18, wherein the post comprises one or more of: a message associated with the at least one content item, an additional content item, an additional content item and a message, or a message associated with a content item already stored in the shared virtual space.

20. The method of claim 18, wherein displaying further comprises:
displaying, prior to sending, the at least one content item and the post within the shared virtual space on the user device.

21. The method of claim 18, further comprising:
detecting user interactions with the post on the shared virtual space.

22. The method of claim 21, further comprising:
sending data associated with the user interactions to the content management system; and
displaying, prior to sending the data associated with the user interactions, the shared virtual space on the user device as if the data has already been sent to the content management system.

23. The method of claim 18, wherein:
the at least one contact is able to add an additional post to the global version of the shared virtual space; and
after the post has been added, the global version of the shared virtual space is locked.

24. The method of claim 18, further comprising:
posting, automatically, any content items shared between the user and the at least one contact to one or more of: the shared virtual spaces or the global version of the shared virtual space.

25. The method of claim 18, further comprising:
sending a notification to the user in response to one or more of:
a content item comprising the user being added to the global version of the shared virtual space; or
a new post being added to the global version of the shared virtual space.

* * * * *